United States Patent
Paliwal et al.

(10) Patent No.: US 12,457,271 B2
(45) Date of Patent: Oct. 28, 2025

(54) SYSTEM, APPARATUS AND METHOD FOR HANDLING MULTI-PROTOCOL TRAFFIC IN DATA LINK LAYER CIRCUITRY

(71) Applicant: Intel Corporation, Santa Clara, CA (US)

(72) Inventors: Nitish Paliwal, Hillsboro, OR (US); Peeyush Purohit, Portland, OR (US); Swadesh Choudhary, Mountain View, CA (US); Manjula Peddireddy, Santa Clara, CA (US); Mahesh Natu, Folsom, CA (US); Mahesh Wagh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 873 days.

(21) Appl. No.: 17/128,648

(22) Filed: Dec. 21, 2020

(65) Prior Publication Data

US 2021/0112132 A1    Apr. 15, 2021

(51) Int. Cl.
| | | |
|---|---|---|
| H04L 29/08 | (2006.01) | |
| H04L 12/741 | (2013.01) | |
| H04L 12/863 | (2013.01) | |
| H04L 45/74 | (2022.01) | |
| H04L 47/62 | (2022.01) | |
| H04L 67/568 | (2022.01) | |

(52) U.S. Cl.
CPC ............ H04L 67/568 (2022.05); H04L 45/74 (2013.01); H04L 47/62 (2013.01)

(58) Field of Classification Search
CPC ........ H04L 67/568; H04L 45/74; H04L 47/62
See application file for complete search history.

(56) References Cited

U.S. PATENT DOCUMENTS

| | | | |
|---|---|---|---|
| 6,119,150 A * | 9/2000 | Fujii | G06F 12/0813 |
| | | | 709/213 |
| 10,135,726 B2* | 11/2018 | Jiang | H04L 49/70 |
| 2003/0095559 A1* | 5/2003 | Sano | H04L 47/40 |
| | | | 710/22 |
| 2018/0095923 A1* | 4/2018 | Iyer | G06F 13/4022 |
| 2018/0123954 A1* | 5/2018 | Jiang | H04L 49/70 |
| 2019/0384733 A1* | 12/2019 | Jen | H04L 69/04 |
| 2020/0012604 A1 | 1/2020 | Agarwal | |
| 2022/0066636 A1* | 3/2022 | Taki | G06F 3/0679 |

OTHER PUBLICATIONS

Intel Corporation, "Compute Express Link, Specification, Revision 1.0," Mar. 2019, 206 pages.

(Continued)

*Primary Examiner* — Luat Phung
(74) *Attorney, Agent, or Firm* — Eversheds Sutherland (US) LLP

(57) ABSTRACT

In one embodiment, an apparatus includes: a transaction layer circuit to output transaction layer information; and a link layer circuit coupled to the transaction layer circuit, the link layer circuit to receive and process the transaction layer information and to output link layer information to a physical circuit. The link layer circuit may include a first selection circuit to receive and direct cache memory protocol traffic to a selected one of a first logical port and a second logical port. Other embodiments are described and claimed.

19 Claims, 11 Drawing Sheets

(56) References Cited

OTHER PUBLICATIONS

Intel Corporation, "Logical PHY Interface (LPIF) Specification," 2019, 63 pages.
European Patent Office, Office Action mailed Feb. 18, 2022 in European Patent Application No. 21197344.1 (7 pages).
European Patent Office, Communication Pursuant to Article 94(3) dated Jan. 27, 2023 in European Patent Application No. 21197344.1 (4 pages).
European Patent Office, Communication Pursuant to Article 94(3) dated Apr. 26, 2024 in European Patent Application No. 21197344.1 (8 pages).

\* cited by examiner

SYSTEM, APPARATUS AND METHOD FOR HANDLING MULTI-PROTOCOL TRAFFIC IN DATA LINK LAYER CIRCUITRY

TECHNICAL FIELD

Embodiments relate to multi-protocol communications via a link.

Background

Compute Express Link (CXL) is an interconnect technology that allows attachment of CXL-compliant devices to host processor systems. CXL links are implemented according to a given CXL specification such as the CXL Specification version 1.1 (published June 2019). A device may couple to such CXL links via a FlexBus (FxB) port. There may be single or multiple devices attached on the same FxB port concurrently using link subdivision. However currently there are restrictions as to types of devices allowed to be connected to specific lanes of the link, which unduly limits flexibility.

DETAILED DESCRIPTION

Figure 1:
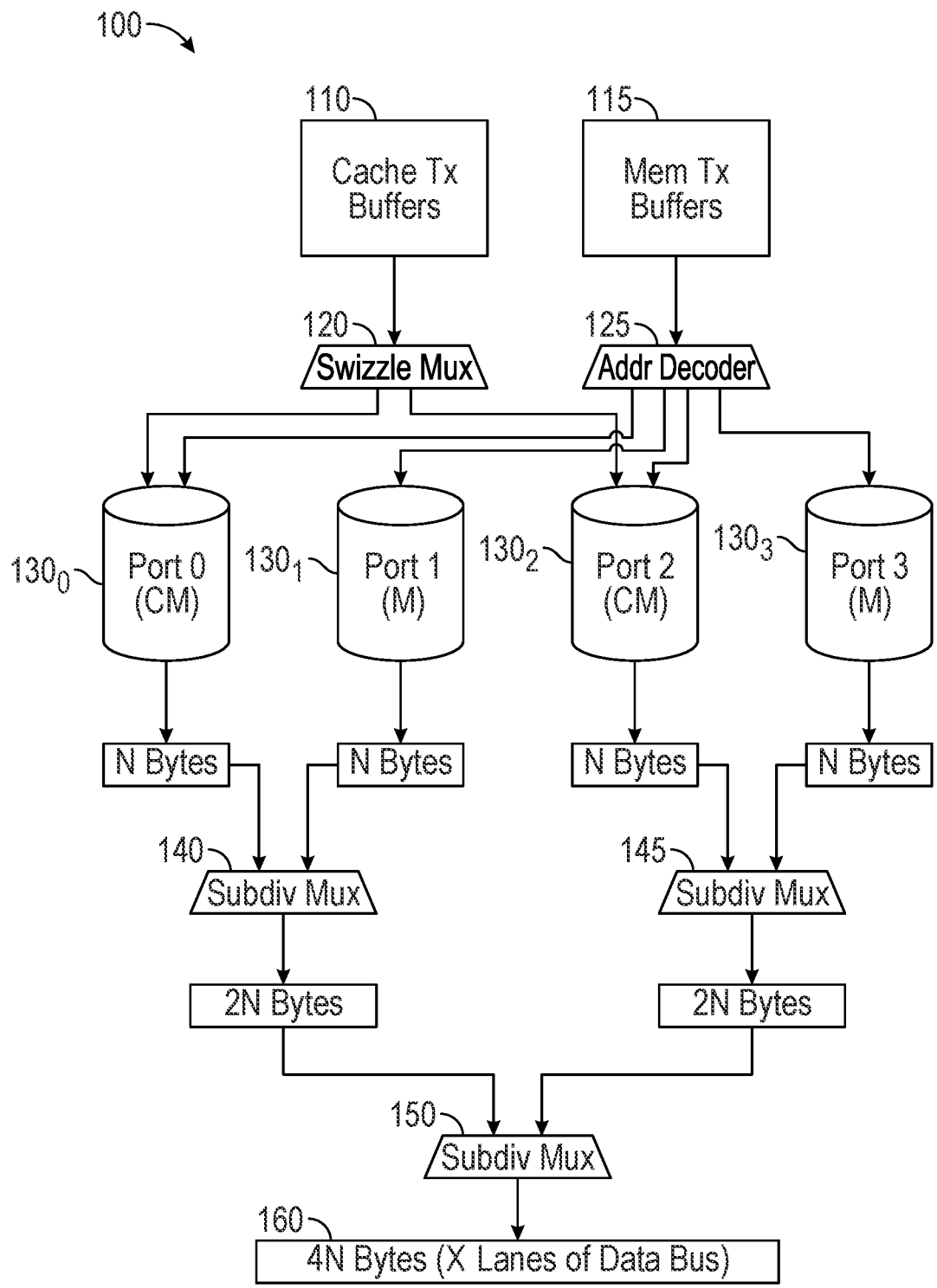
FIG. 1 is a block diagram of a control circuit that may be present in a link layer in accordance with an embodiment.

In various embodiments, a data link layer (also "link layer" or "link layer circuit" herein) is provided that can support multi-protocol message transmission and further allow flexibility as to device types that may be attached on specific lanes of an interconnect. As a result, richer feature sets can be realized without an added cost in terms of silicon area and power.

This data link layer may be part of a protocol stack through which communications flow, where the protocol stack further includes a transaction layer and a physical layer. While flexible device attachment and link layer circuitry are described in connection with a CXL-based system, embodiments are not limited in this regard.

Further while one example use case is for a cloud-based architecture that may communicate using interconnects and switches in accordance with a CXL specification such as the CXL 1.1 Specification or any future versions, modifications, variations or alternatives, other implementations are possible. For example embodiments may be used in other coherent interconnect technologies such as an IBM XBus protocol, an Nvidia NVLink protocol, an AMD Infinity Fabric protocol, cache coherent interconnect for accelerators (CCIX) protocol or coherent accelerator processor interface (OpenCAPI).

In a CXL implementation, traffic flows of different communication protocols are sent along CXL interconnects. For example, there may be separate traffic flows including so-called CXL.cache, CXL.io and CXL.mem communication protocols via which traffic of different communication protocols is communicated. More generally, the interconnect may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

With embodiments a microarchitecture for a data link layer may include circuitry to flexibly support multiple protocols (such as both CXL.cache and CXL.mem (collectively here "CXL.cache-mem") through a single pipeline, where protocol traffic is routed to apropos bifurcated physical lanes without adding extra performance overheads and hardware penalties.

In different implementations, configuration of a link layer to provide flexible port mappings can be realized using hardware autonomous techniques that may ameliorate any system software overhead, or using a software-based technique via system level software. With embodiments herein, platform architects and users can realize flexible attach points for CXL Type 1 and 2 (cache-capable) devices without additional hardware cost. That is, link layer and other circuitry may be reused across ports instead of duplicating data main-band modules for packing communications. As such, embodiments provide flexibility with negligible power, performance, and area impact.

With embodiments, common design resources are used to realize link subdivision without logic replication, thus providing flexibility with negligible power and area impact, and no performance impact. For instance, embodiments use shared buffer resources for CXL.cache protocol traffic across ports and use multiplexing and demultiplexing schemes to route traffic to apropos device/port, realizing significant reduction of bit-cells for storage.

Embodiments also operate with zero performance degradation both in terms of latency and bandwidth, by simplifying selection circuitry to be a single logic level scheme and restricting bus routing requirements for CXL.cache channel only. Other link specific peripheral functions built into the controller such as RAS, power management may continue to operate on per-port granularity, seamlessly. Other unique host specific implementation functions built into the controller such as bus lock and interrupt handling may also operate seamlessly and need not be made aware of Flexbus topology.

In embodiments a link layer may include a personality agnostic data link layer (CXLCM) module as a controller instance (referred to herein as a "CXLCM controller") capable of transporting CXL.cache and CXL.mem protocol messages over a FxB link without any restrictions on where a cache-capable device is attached. In some cases any port may be selected as an attach point for a cache-capable device. According to current CXL architectural requirements, a cache-capable Type 1 or Type 2 device warrants support for ×8 link width. To reduce routing requirements, an embodiment may enable selection of a limited number of ports as a choice of attach point for connecting an accelerator to CPU host. Of course embodiments are not limited in this regard, and other embodiments may extend support to all ports where support for ×4 cache-capable devices is warranted.

In an embodiment, the CXLCM controller may interface with a logical physical unit (PHY) module according to a data bus in accordance with a Logical PHY Interface (LPIF) Specification, such as the LPIF Specification version 1.0 (March 2019) or any future versions, modifications or variations. To enable CXCLM controller configuration, embodiments may use LPIF-based information/encodings to identify detected devices. In an embodiment, a LPIF data bus interface is 16 lanes wide [15:0] and is shared across subdivided ports based on how a FxB link is natively subdivided. For example, for 2×8 attachments, lower 8 lanes [7:0] map to Port 0 and upper 8 lanes [15:8] map to Port 2 respectively. Similarly, for 4×4 devices, lanes [3:0], [7:4], [11:8], and [15:12] map to Port 0, Port 1, Port 2, and Port 3, respectively.

Figure 2:
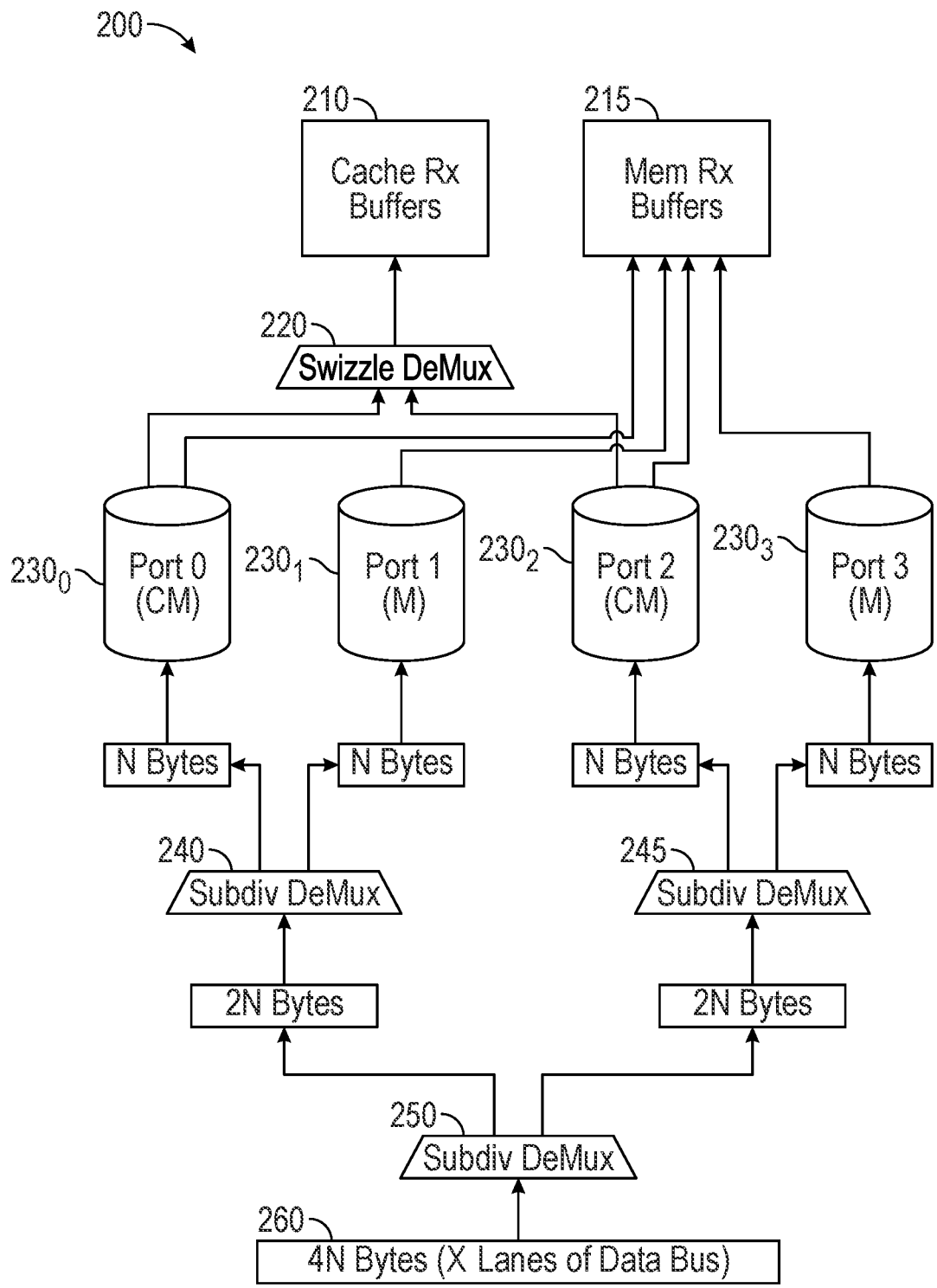
FIG. 2 is a block diagram of a control circuit that may be present in a link layer in accordance with another embodiment.

With this in perspective, FIGS. 1 and 2 outline a high level block diagram of link layer circuitry for both transmit (Tx) and receive (Rx) directions, where a link is subdivided in 4×4 port configuration, and Ports 0 and 2 are annotated to support both cache and memory traffic. Of course other variations of ports and links widths are possible in other embodiments.

Referring now to FIG. 1, shown is a block diagram of a control circuit that may be present in a link layer in accordance with an embodiment. As shown in FIG. 1, a transmit pipe of a control circuit 100—such as a CXLCM controller is shown. This control circuit may be present in link layer circuitry of a CXL protocol stack. While this control circuit is for an embodiment according to a CXL implementation, understand that other implementations are possible.

As illustrated, incoming information, e.g., from a transaction layer, may be received in a given buffer 110, 115. More specifically, incoming cache memory protocol traffic may be stored in cache transmit buffers 110. In turn incoming memory protocol traffic may be stored in memory transmit buffers 115. Note that buffers 110, 115 may include or be associated with control circuitry to handle buffer management, e.g., using a credit-based mechanism. With dedicated protocol-based buffers, multi-protocol design may be simplified and various forward progress rules are enforced.

When a given cache memory data unit, such as a packet, flit or so forth is selected for output from buffer 110, it is provided to a first selection circuit 120, which may be implemented as a swizzle multiplexer. Note that communication of protocol traffic throughout the link layer may be on the basis of CXL network flits. As shown, first selection circuit 120 may direct this cache memory protocol traffic to a selected one of multiple logical ports 130.

Specifically as shown, in this example there are four logical ports $130_0$-$130_3$. Each logical port may be mapped to a corresponding physical port present in a physical circuit (not shown for ease of illustration in FIG. 1). With embodiments herein, cache memory protocol traffic may be directed to a selected one of logical port $130_0$ and logical port $130_2$. Of course in other implementations, this traffic may be directed to any of the other logical ports.

Also, depending upon particular configuration each of these ports also may be configured to receive memory protocol traffic. Address decoder 125 in turn may direct a given memory protocol traffic unit to a given one of logical ports 130. Address decoder 125 routes CXL.mem protocol messages to any of ports $130_{0-3}$, depending on which CXL device a memory request message is destined. In this way address decoder 115 routes a memory request transaction in one-master-to-many-subordinates fashion.

Ports 130 may be defined as logical (and potentially structural) entities that provide one-to-one mapping to a subdivided FxB link (and thus to corresponding physical ports of a physical layer). Annotation of (CM) in ports $130_0$ and $130_2$ specifies that a given port is capable of packing cache and memory transactions, whereas (M) specifies that a given port is capable of packing memory transactions only (e.g., ports $130_1$ and $130_3$). In this way, embodiments implement a silicon area optimized design where a 'super-set' capable port is not required for all port [i] instances.

In an example each port 130 may output N bytes of data information (e.g., 16 bytes in one example). As further illustrated, the output of pairs of ports 130 may be provided to an additional level of selection circuits, namely subdivision multiplexers 140, 145. In turn, up to 2N bytes may be output from these multiplexers to another level selection circuit, namely another subdivision multiplexer 150, which may pass given traffic on particular lanes of a data bus 160. Note that in another embodiment, the various selection circuits may be implemented below port [i] hierarchies. Data bus 160 may be implemented as a LPIF data bus to couple a link layer to a physical layer circuit, that in turn couples to one or more devices via a CXL link. Understand while shown at this high level in the embodiment of FIG. 1, many variations and alternatives are possible.

Referring now to FIG. 2, shown is a block diagram of a control circuit that may be present in a link layer in accordance with another embodiment. As shown in FIG. 2, a receive pipe of a control circuit 200 such as a CXLCM controller is shown. This control circuit may be present in link layer circuitry of a CXL protocol stack (and may be included as part of the same circuitry as control circuit of FIG. 1).

As illustrated, incoming information, e.g., from a data bus 260 is received via physical layer circuitry and provided via selection circuitry implemented as a subdivision demultiplexer 250 and to an additional level of selection circuits, namely subdivision demultiplexers 240, 245. In turn, up to 2N bytes that are received may be output in N byte chunks to corresponding logical ports $230_0$-$230_3$, each of which may be mapped to a corresponding physical port present in a physical circuit. In this receive direction, logical port $230_0$ and logical port $230_2$ may communicate via a selection circuit 220, which may be implemented as a swizzle demultiplexer, to a cache receive buffer 210. In turn memory protocol traffic may be directed from any of ports $230_0$-$230_n$ to a memory receive buffer 215. Understand while shown at this high level in the embodiment of FIG. 2, many variations and alternatives are possible.

Selection circuitry present in control circuits 100 and 200 (e.g.) may be used to route concurrent cache and memory traffic to various sub-divided ports through a controller stack. Depending on implementation, selection control for this circuitry may be performed on a hardware autonomous or software basis.

In a hardware autonomous implementation, a link layer may use information presented on a LPIF control interface bus to determine whether to activate particular select lines. To this effect, physical layer (pl_protocol) encodings according to a LPIF definition provide clues about device types that are detected during training. Details about such 3-bit encodings are available in the LPIF specification and attached devices advertise protocol encodings during boot-time that it intends to be operational during run-time. This hardware autonomous approach may enable a CXLCM controller to sample and latch pl_protocol encodings and implement a phased priority approach to activate selection circuitry.

Table 1 illustrates a possible approach; however an alternate implementation may choose not to follow this behavior.

TABLE 1 i. Sample pl_protocol encodings on per-port basis as defined in the LPIF specification
ii. If Port 0 detects Type1/2 Device and Port 2 did not, train Port 0 and deactivate swizzle.
iii. If Port 2 detects Type1/2 Device and Port 0 did not, train Port 2 and activate swizzle.
iv. If both Port 0 and Port 2 detect Type1/2 Device, disable Port 2 and deactivate swizzle. Rely on system software to disable caching function of Port 2 connected device.

Protocol encodings may be only be forwarded to a CXLCM controller once a concrete personality of device attached has been established. This means that protocol encodings on per-port basis may show up in different timestamps. A hardware implementation may choose to gate virtual link state training for all ports until protocol encodings associated with all ports are received. Alternatively, hardware may choose to train ports that have received pertinent protocol encodings and rely on logging user-defined severity errors if more than one cache-capable device shows up. It is generally expected that in a CXL implementation according to a CXL specification version 1.1 or 2.0, only one cache-capable Type 1/Type 2 device is present behind a link, and a CXL.cache capability in all but one of these devices is disabled if there are plurality of such devices attached. However, handling of such cases either through software intervention or through error reporting mechanisms can be implementation specific, and may vary in future CXL specification versions.

Figure 3:
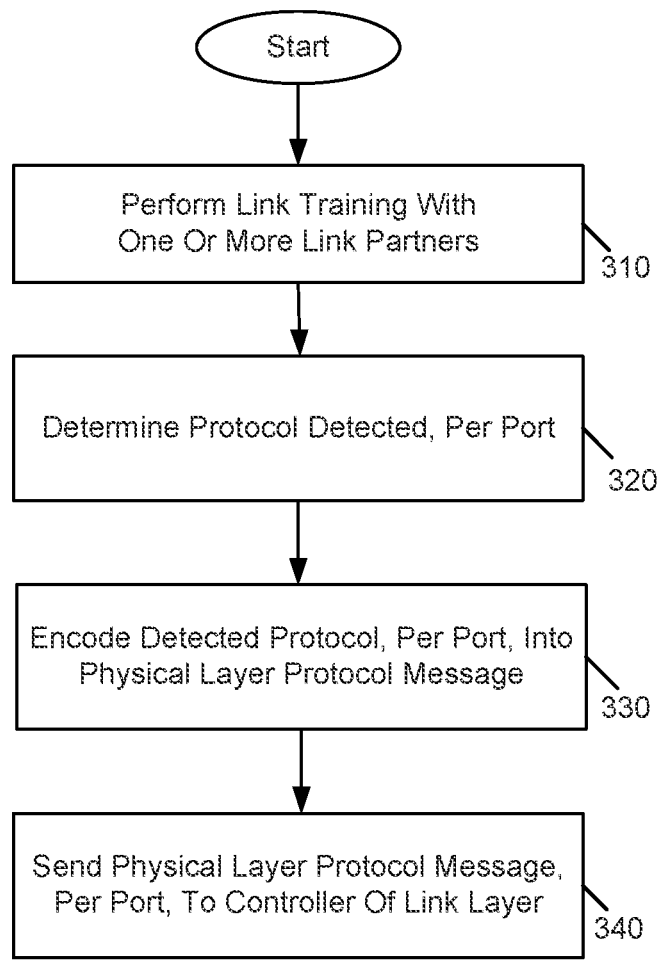
FIG. 3 is a flow diagram of a method in accordance with an embodiment.

Referring now to FIG. 3, shown is a flow diagram of a method in accordance with an embodiment. As shown in FIG. 3, method 300 is a method for booting up a system having a CXL link to which devices may couple. Method 300 may be performed on boot up and may be implemented within a logical portion of a physical circuit, e.g., executed as part of link training. As such method 300 may be performed by hardware circuitry alone, or combination with firmware and/or software. As illustrated, method 300 begins by performing link training between link partners, which may include discovery of devices coupled to the link (block 310). By way of this link training, devices coupled to the CXL link can be identified as well as their communication capabilities.

As part of this information, it may be determined, on a per port basis, what type of communication protocol is detected with regard to a device coupled to such port (block 320). For example, in an implementation in which a physical circuit includes 4 physical ports, up to 4 devices may be coupled, each to one of these ports. Different manners of detecting the device types can occur in different implementations. In some cases, devices may communicate, on boot up, certain initialization information that includes an identification of the type of device. Of course this information can be discovered in other manners, such as via boot time information, e.g., provided by a basic input output system (BIOS) or other system software.

Still with reference to FIG. 3, control next passes to block 330 where the detected protocol may be encoded, on a per core basis, into a physical layer protocol message. In a CXL implementation where physical layer and link layer couple via a LPIF data bus, this message may be implemented as pl_protocol message. Finally, at block 340 this message may be sent, on a per port basis, to a controller of a link layer to which the physical circuit is coupled. Understand that with this information regarding the detected protocols, the link layer in turn may configure its internal circuitry to pass data of the appropriate protocol type via its internal logical ports.

Figure 4:
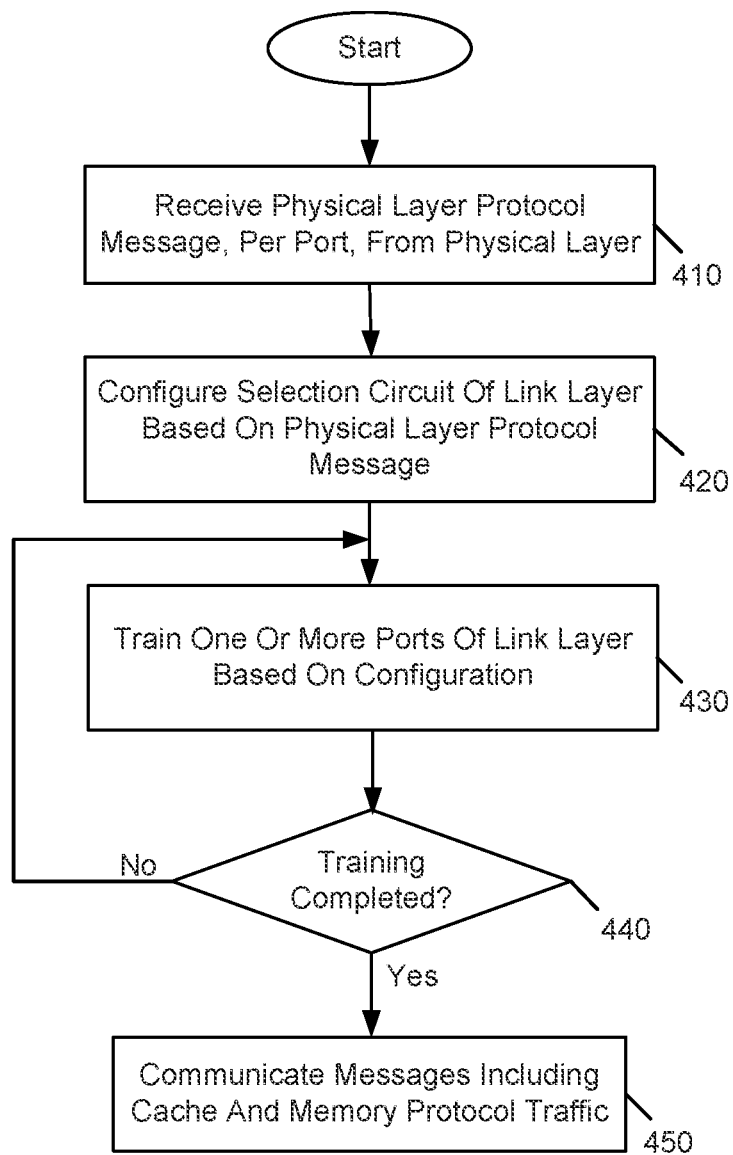
FIG. 4 is a flow diagram of a method in accordance with another embodiment.

Referring now to FIG. 4, shown is a flow diagram of a method in accordance with another embodiment. As shown in FIG. 4, method 400 is a method for booting up a system having a CXL link, and more particularly to operations performed within a link layer circuit. As such method 400 may be performed by hardware circuitry alone, or combination with firmware and/or software.

As shown, method 400 begins by receiving a physical layer protocol message from physical layer (block 410). As discussed above, this message, which in a CXL implementation having a LPIF data bus to interconnect link layer and physical layer, can be a pl_protocol message, may be received on a per port basis. Next at block 420, at least one selection circuit may be configured based on this message information. For example, with reference back to FIG. 1, first selection circuit 120 may be configured based on such physical layer protocol messages.

Still with reference to FIG. 4, next at block 430 link training may be performed based on the configuration of the link layer. More specifically, this training may be used to ensure that communication between devices occurs with appropriate parameters to ensure a low error rate. As part of this training, a virtual link state machine training may occur to thus place the link into active state. When it is determined at diamond 440 that training has completed, at block 450 messages may be communicated from the link layer and through the physical layer to a given device. Here in the context of providing configurable subdivision of a bus, CXL.cache and CXL.memory protocol traffic may be directed on a selected one of multiple ports, thus providing greater flexibility within a system. Understand while shown at this high level in the embodiment of FIG. 4, many variations and alternatives are possible.

In another embodiment, system software such as BIOS, which is used to enumerate, setup, and configure CXL stacks to operate under various topological and platform constraints, can be used to control selection lines once during boot, to scatter CXL.cache traffic to a selected port to perform flit packing. Similarly, this technique can be used to control selection lines once during boot to gather CXL.cache traffic from a selected port after flit unpacking. In order to save power when a given link may not be trained, hardware can explicitly be programmed to enter link-active state once selection lines are appropriately configured in tandem.

Figure 5:
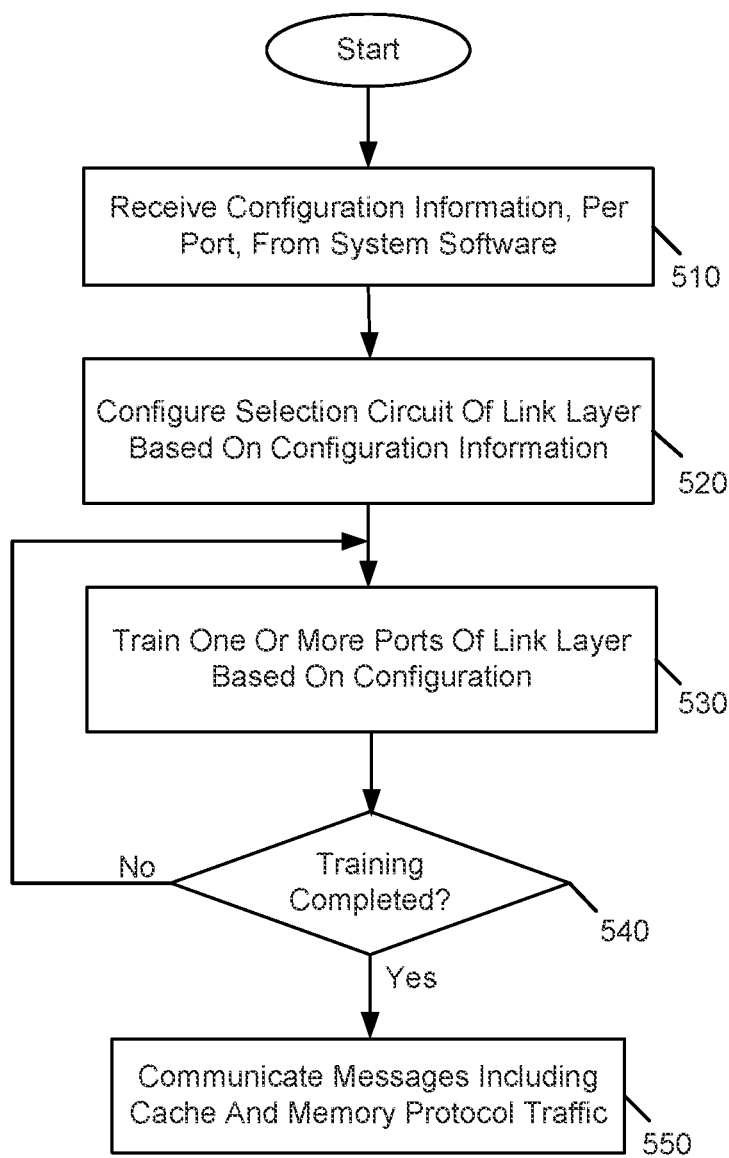
FIG. 5 is a flow diagram of a method in accordance with a still further embodiment.

Referring now to FIG. 5 shown is a flow diagram of a method in accordance with a still further embodiment. As shown in FIG. 5, method 500 is another method for booting up a system having a CXL link, and more particularly to operations performed within a link layer circuit. As such method 500 may be performed by hardware circuitry alone, or combination with firmware and/or software.

As shown, method 500 begins by receiving configuration message, on a per port basis, from system software (block 510). As discussed above, this message may be from BIOS and may include flexible topology control information including configuration bits that can be used to set fields in one or more configuration registers. Next at block 520, at least one selection circuit (e.g., first selection circuit 120 of FIG. 1) may be configured based on this configuration information.

Still with reference to FIG. 5, next at block 530 link training may be performed based on the configuration of the link layer, including virtual link state machine training to place the link into active state. When it is determined at diamond 540 that training has completed, at block 550 messages may be communicated from the link layer and through the physical layer to a given device. Here in the context of providing configurable subdivision of a bus, CXL.cache and CXL.memory protocol traffic may be directed on a selected one of multiple ports, thus providing greater flexibility within a system.

In an embodiment this software control can be according to BIOS controllable register bits, which may be stored in a configuration register that may be present within a CXLCM controller. In one implementation, a first configuration bit may be implemented as a first indicator, referred to as swizzle_active, which can be used to control swizzling CXL.cache traffic to/from Port 0. This indicator may be set when CXL.cache traffic is to be routed to/from a logical Port 2 hierarchy when BIOS discovers that a cache-capable Type 1 or Type 2 device is attached to Port 2. This indicator may not be written if a cache-capable Type 1 or Type 2 device is attached to Port 0. In an embodiment, this bit-field may be implemented using a 'lock' attribute such that its contents are not allowed to be accidentally modified once a go_train indicator (defined next) is programmed.

In one implementation, a second configuration bit may be implemented as a second indicator, referred to as go_train, which can be used to control a CXLCM controller requesting to enter into a link active state and provide a guarantee that the swizzle_active bit is programmed with the desired value. In an embodiment, this bit-field is implemented using a 'write-to-see' attribute such that its contents can only be written to a value of 0x1 and not allowed to be accidentally overwritten (cleared) once set. Once this bit-field is written into, it may be used to lock the swizzle_active bit indication to preserve intended hardware behavior.

These indicators for a particular embodiment, are further described in Table 2.

TABLE 2

| FLEX_TOPO_CTRL | Bit Width | Bit Offset | Field Name | Access Type | Default | Description |
|---|---|---|---|---|---|---|
| | 1 | 0 | swizzle_active | RW/L | 0x0 | This bit controls swizzling traffic. When set, CXL.cache traffic on Logical Port 0 traffic will be routed to/from Physical Port 2 and vice-versa. This bit has Lock attribute which means Lockable for that register field contingent to programming of go_train bit |
| | 1 | 1 | go_train | RW/1S | 0x0 | Go indication for IP's virtual Link State Machines to request for Active. This is an additional requirement that must be evaluated in conjunction to LPIF control signals. Software must only write to this bit once desired configuration for swizzle_active has been programmed, set-on-write attribute will ensure that once register is written, S/W will not be able to accidentally reprogram it to 0. |

Figure 6:
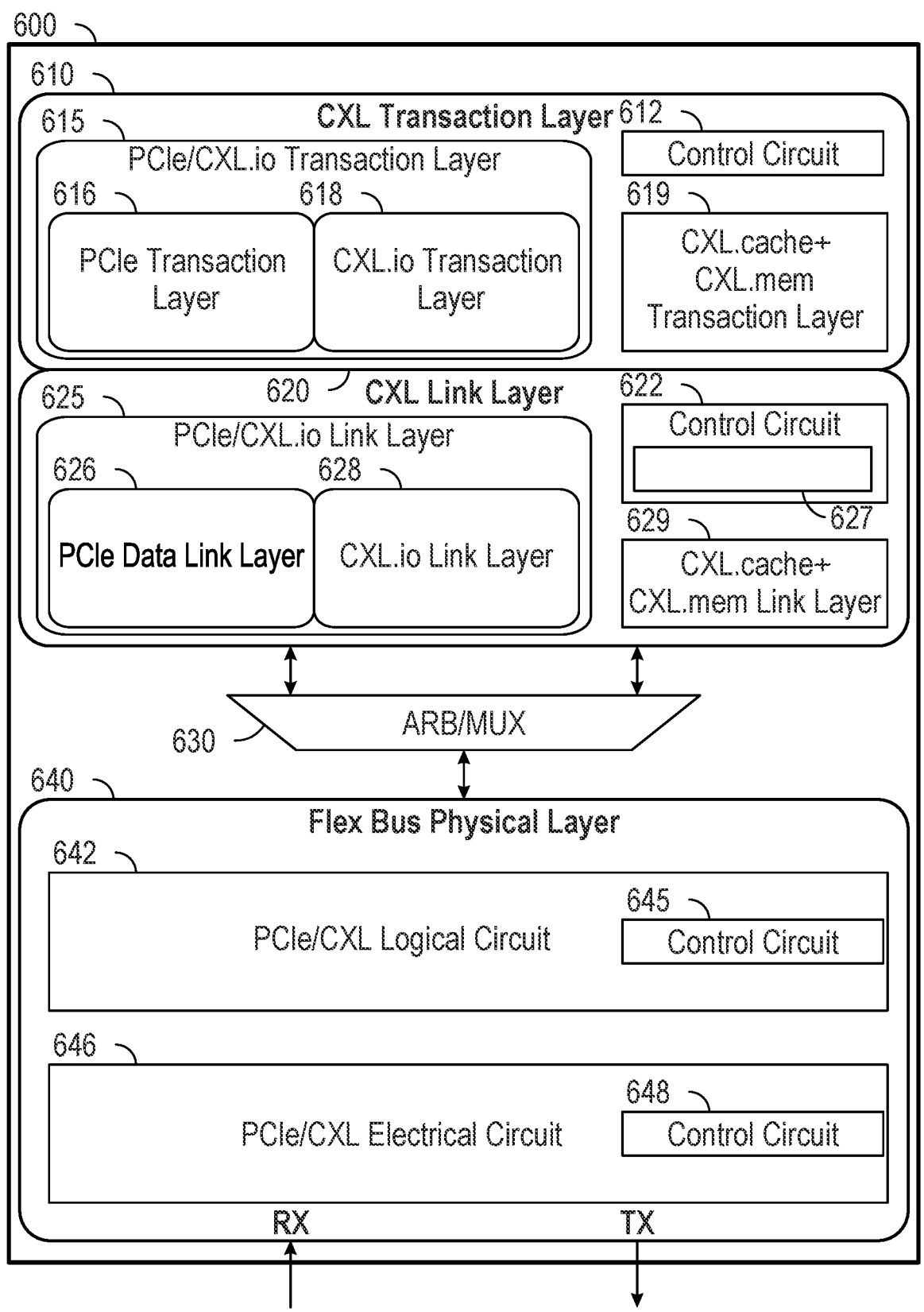
FIG. 6 is a block diagram of an interface circuit in accordance with an embodiment.

Referring now to FIG. 6, shown is a block diagram of an interface circuit in accordance with an embodiment. More specifically as shown in FIG. 6, interface circuit 600 is for interfacing a given device such as a transmitter and/or receiver to a link. In the embodiment shown in FIG. 6, interface circuit 600 is a CXL interface circuit. As shown, CXL interface circuit 600 includes a transaction layer 610, a link layer 620, and a physical layer 640. With reference to CXL transaction layer 610, various components are included to enable transaction layer processing for PCIe/CXL.io communications and CXL.cache and CXL.memory transactions. More particularly, a PCIe/CXL.io transaction layer 615 includes a control circuit 612, which may perform various transaction layer control operations. In addition, transaction layer 610 further includes a PCIe transaction layer 616 and additional circuitry 618 for handling enhancements to PCIe transaction layer 616 for handling CXL.io transactions. In turn, CXL.cache and CXL.memory transaction layer 619 may perform transaction layer processing for these protocols.

With reference to CXL link layer 620, various components are included to enable link layer processing for PCIe/CXL.io communications and CXL.cache and CXL.memory transactions. More particularly, a PCIe/CXL.io link layer 625 includes a PCIe data link layer 626 and additional circuitry 628 for handling enhancements to PCIe data link layer 626 for handling CXL.io transactions.

In turn, CXL.cache and CXL.memory link layer 629 may perform link layer processing for these protocols using a single logic stack without logic duplication. As described herein, such processing includes flexibly routing CXL.cache and CXL.mem protocol traffic on selected logical ports. To this end, a control circuit 622 may configure selection circuitry within link layer 629 to direct given protocol traffic to particular logical ports. In an embodiment, control circuit 622 may include or be coupled to one or more configuration registers 627. Such configuration registers may include one or more fields to control the selection circuitry as described herein.

With further reference to FIG. 6, link layer 620 is coupled to an arbiter/multiplexer 630 that is to receive incoming data streams from link layer 620 and select a data stream (or portion thereof) for communication to a physical layer 640.

In an embodiment, physical layer 640 may be a physical layer to further process incoming data packets for communication on a physical link, which in an embodiment may be a flex bus. As illustrated, physical layer 640 includes a PCIe/CXL logical circuit 642 and a PCIe/CXL electrical circuit 646. As seen, these circuits include respective control circuits 645, 648 to control processing within physical layer 640. With embodiments herein, control circuit 645 may send pl_protocol messages to link layer 620 to indicate detection of particular device types on a CXL link. After all such processing is completed, outgoing transaction layer data packets may be communicated on the link. Similarly, incoming transaction layer data packets may be received within physical layer 640 and processed within the communication stack of interface circuit 600. Understand while shown at this high level in the embodiment of FIG. 6, many variations and alternatives are possible.

Figure 7:
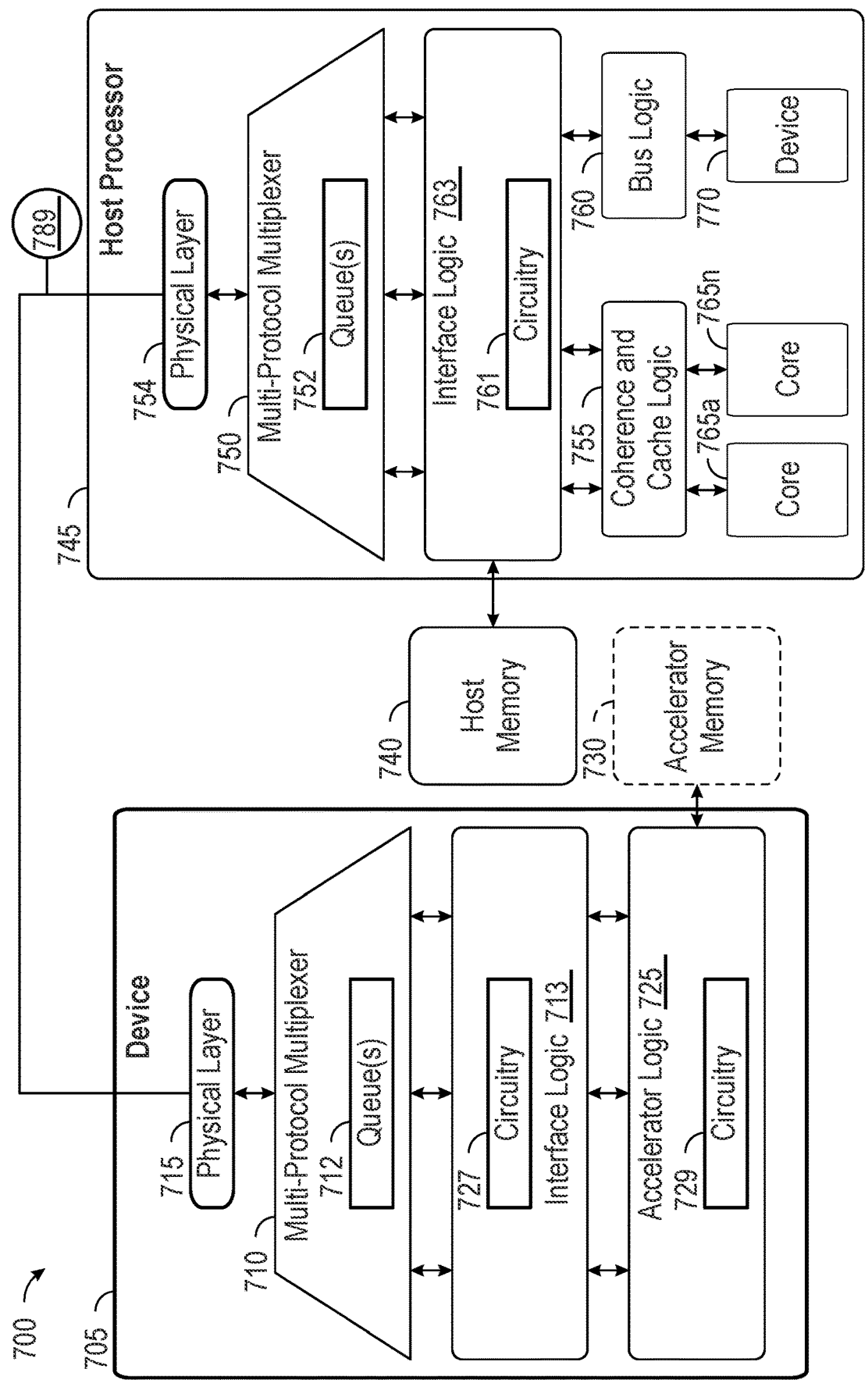
FIG. 7 is a block diagram of a system in accordance with an embodiment.

FIG. 7 is a block diagram 700 of a system in accordance with an embodiment. As shown in FIG. 7 a device 705 may be an accelerator or processor device coupled to a host processor 745 via an interconnect 789, which may be single interconnect, bus, trace, and so forth. Device 705 and host processor 745 may communicate over link 789 to enable data and messages to pass therebetween. In some embodiments, link 789 may be operable to support multiple protocols and communication of data and messages via the multiple interconnect protocols, including a CXL protocol as described herein. For example, link 789 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 705 may include accelerator logic 725 including circuitry 729. In some instances, accelerator logic 725 and circuitry 729 may provide processing and memory capabilities. Examples of device 705 may include producer-consumer devices such as a graphics or other specialized accelerator, producer-consumer plus devices, software-assisted device memory devices, autonomous device memory devices, and giant cache devices. In some cases, accelerator logic 725 may couple to an optional accelerator memory 730. Accelerator logic 725 and circuitry 729 may provide the processing and memory capabilities based on the device. For example, accelerator logic 725 and circuitry 729 may communicate using, for example, a coherent interconnect protocol for various functions, such as coherent requests and memory flows with host processor 745 via interface logic 713 and circuitry 727.

Interface logic 713 and circuitry 727 may determine an interconnect protocol based on the messages and data for communication. Understand that with embodiments herein, circuitry 727 may include selection circuitry to direct, e.g., CXL.cache and CXL.memory protocol traffic, via a selected one of multiple logical ports as described herein. In some embodiments, interface logic 713 may be coupled to a multi-protocol multiplexer 710 having one or more protocol queues 712 to send and receive messages and data with host processor 745. Protocol queue 712 may be protocol specific such that each interconnect protocol may be associated with a particular protocol queue. Multiplexer 710 may also implement arbitration circuitry to arbitrate between communications of different protocols and provide selected communications to a physical layer 715.

In various embodiments, host processor 745 may be a main processor such as a CPU. Host processor 745 may be coupled to a host memory 740 and may include coherence logic (or coherence and cache logic) 755, which may include a cache hierarchy. Coherence logic 755 may communicate using various interconnects with interface logic 7763 including circuitry 761 and one or more cores 765a-n. In some embodiments, coherence logic 755 may enable communication via one or more of a coherent interconnect protocol and a memory interconnect protocol.

In various embodiments, host processor 740 may include a device 770 to communicate with a bus logic 760 over an interconnect. In some embodiments, device 770 may be an I/O device, such as a PCIe I/O device. In other cases, one or more external devices such as PCIe devices may couple to bus logic 770.

In embodiments, host processor 745 may include interface logic 763 and circuitry 761 to enable multi-protocol communication between the components of host processor 745 and device 705. Interface logic 763 and circuitry 761 may process and enable communication of messages and data between host processor 745 and device 705 in accordance with one or more interconnect protocols, e.g., a non-coherent interconnect protocol, a coherent interconnect protocol, and a memory interconnect protocol, dynamically. For example, interface logic 763 and circuitry 761 may determine a message type for each message and determine which interconnect protocol of a plurality of interconnect protocols to process each of the messages. Different interconnect protocols may be utilized to process the messages. In addition, circuitry 761 may include selection circuitry to direct, e.g., CXL.cache and CXL.memory protocol traffic via a selected one of multiple logical ports as described herein.

In some embodiments, interface logic 763 may be coupled to a multi-protocol multiplexer 750 having one or more protocol queues 752 to send and receive messages and data with device 705. Protocol queue 752 may be protocol specific such that each interconnect protocol may be associated with a particular protocol queue. Multiplexer 750 may also implement arbitration circuitry to arbitrate between communications of different protocols and provide selected communications to a physical layer 754.

Figure 8:
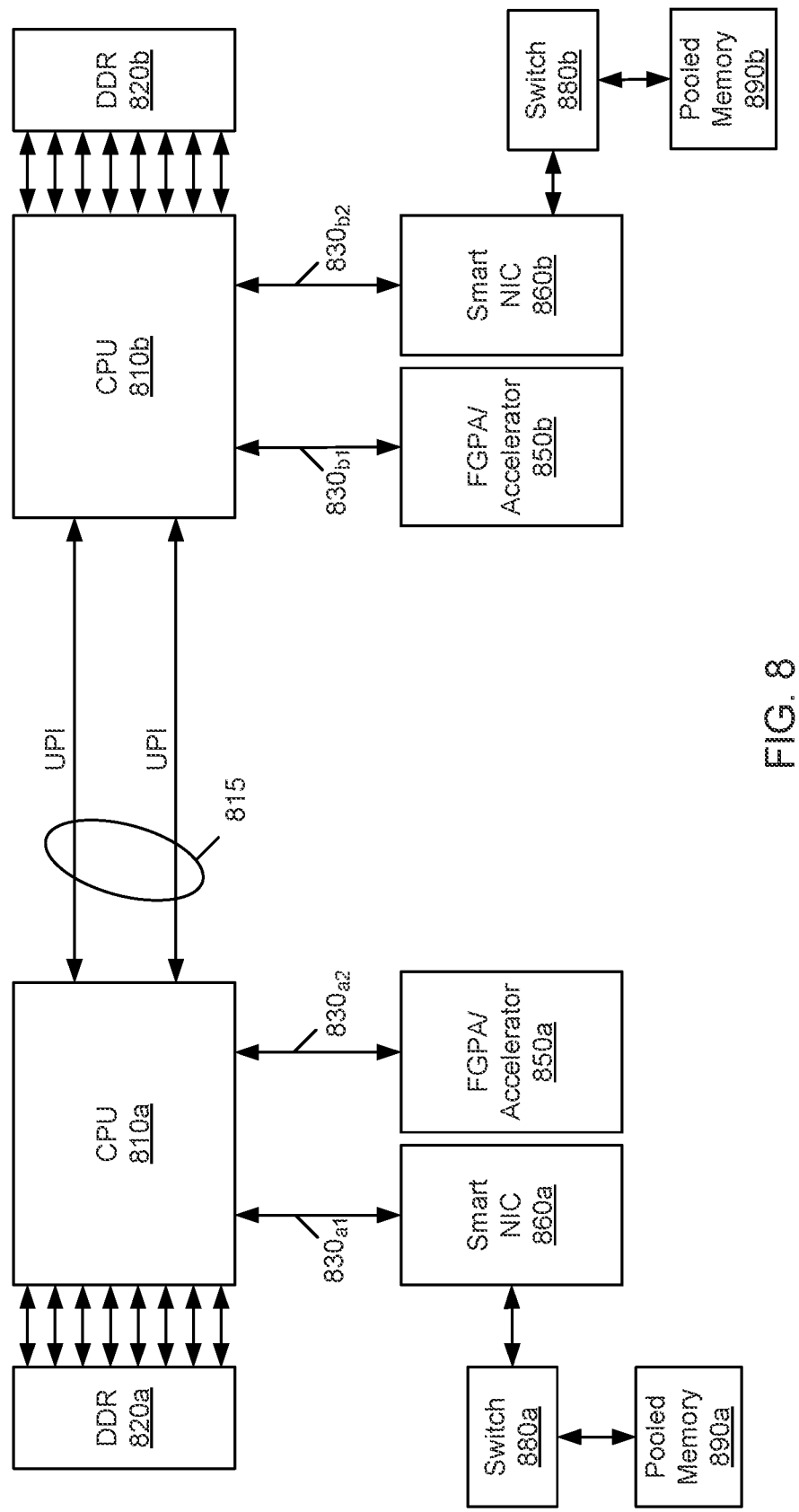
FIG. 8 is a block diagram of a system in accordance with another embodiment of the present invention.

Referring now to FIG. 8, shown is a block diagram of a system in accordance with another embodiment of the present invention. As shown in FIG. 8, a system 800 may be any type of computing device, and in one embodiment may be a server system such as an edge platform. In the embodiment of FIG. 8, system 800 includes multiple CPUs 810a,b that in turn couple to respective system memories 820a,b which in embodiments may be implemented as double data rate (DDR) memory. Note that CPUs 810 may couple together via an interconnect system 815 such as an Intel® Ultra Path Interconnect or other processor interconnect technology.

To enable coherent accelerator devices and/or smart adapter devices to couple to CPUs 810 by way of potentially multiple communication protocols, a plurality of interconnects 830*a*1-*b*2 may be present. In an embodiment, each interconnect 830 may be a given instance of a CXL.

In the embodiment shown, respective CPUs 810 couple to corresponding field programmable gate arrays (FPGAs)/accelerator devices 850*a,b* (which may include graphics processing units (GPUs), in one embodiment. In addition CPUs 810 also couple to smart network interface circuit (NIC) devices 860*a,b*. In turn, smart NIC devices 860*a,b* couple to switches 880*a,b* (e.g., CXL switches in accordance with an embodiment) that in turn couple to a pooled memory 890*a,b* such as a persistent memory. With an arrangement as in FIG. 8, CPUs 810 may direct information of multiple communication protocols (e.g., CXL.cache and CXL.memory protocol traffic) via a selected one of multiple logical ports as described herein to devices 850 on a flexibly allocated port of a CXL link. As shown information can be stored in a pooled memory 890. In turn, CPUs 810 or other entities may access and further process this information from pooled memory 890.

Figure 9:
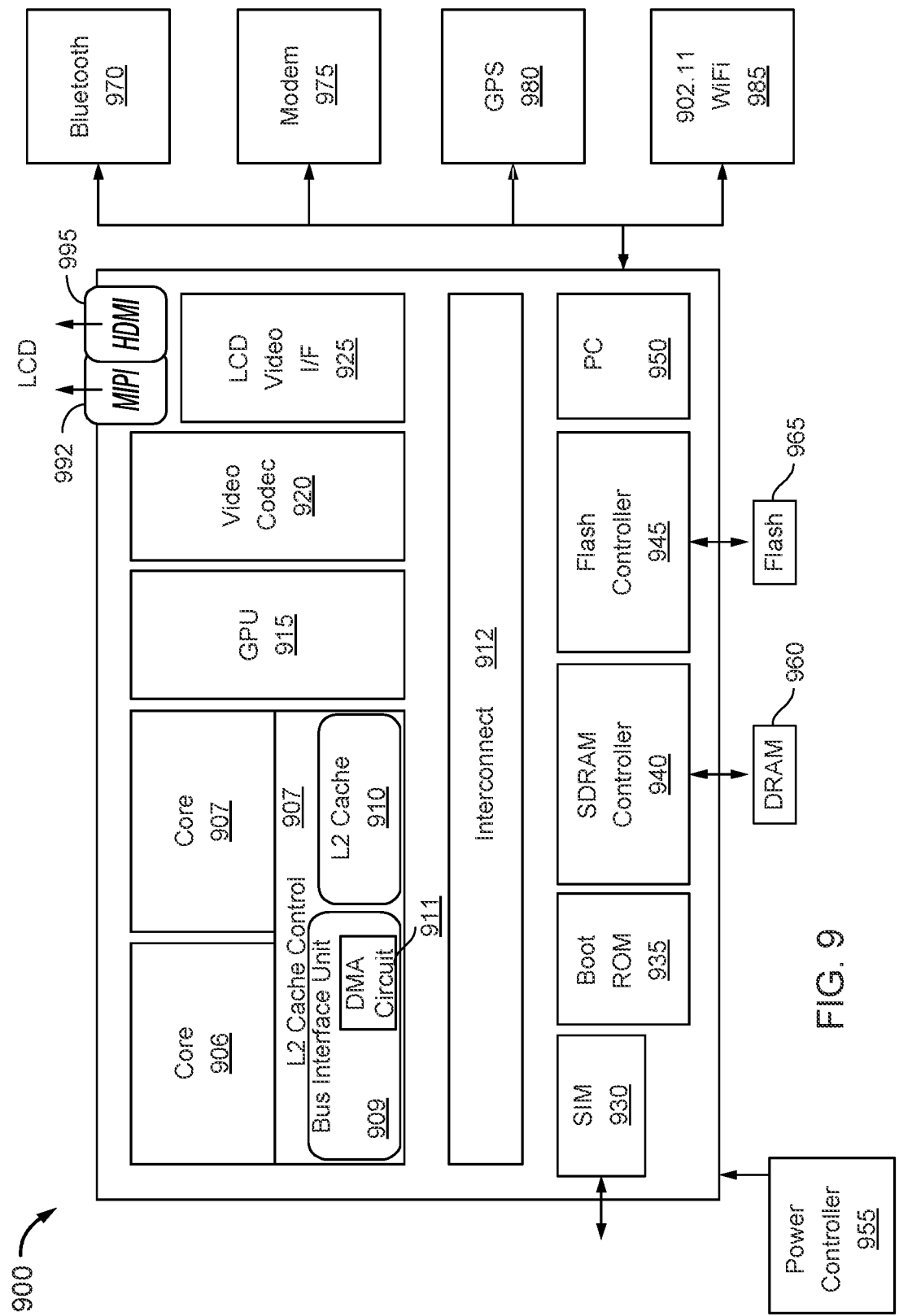
FIG. 9 is a block diagram of an embodiment of a SoC design in accordance with an embodiment.

Turning next to FIG. 9, an embodiment of a SoC design in accordance with an embodiment is depicted. As a specific illustrative example, SoC 900 may be configured for insertion in any type of computing device, ranging from portable device to server system. Here, SoC 900 includes 2 cores 906 and 907. Cores 906 and 907 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 906 and 907 are coupled to cache controller 908 that is associated with bus interface unit 909 and L2 cache 910 to communicate with other parts of system 900 via an interconnect 912, which in an embodiment may provide for communication according to multiple protocols including CXL.cache and CXL.memory protocol traffic via a selected one of multiple logical ports as described herein. As seen, bus interface unit 909 includes a DMA circuit 911 configured to send write requests.

Interconnect 912 provides communication channels to the other components, such as a Subscriber Identity Module (SIM) 930 to interface with a SIM card, a boot ROM 935 to hold boot code for execution by cores 906 and 907 to initialize and boot SoC 900, a SDRAM controller 940 to interface with external memory (e.g., DRAM 960), a flash controller 945 to interface with non-volatile memory (e.g., flash 965), a peripheral controller 950 (e.g., an eSPI interface) to interface with peripherals, video codec 920 and video interface 925 to display and receive input (e.g., touch enabled input), GPU 915 to perform graphics related computations, etc. In addition, the system illustrates peripherals for communication, such as a Bluetooth module 970, 3G modem 975, GPS 980, and WiFi 985. Also included in the system is a power controller 955. Further illustrated in FIG. 9, system 900 may additionally include interfaces including a MIPI interface 992, e.g., to a display and/or an HDMI interface 995 also which may couple to the same or a different display.

Figure 10:
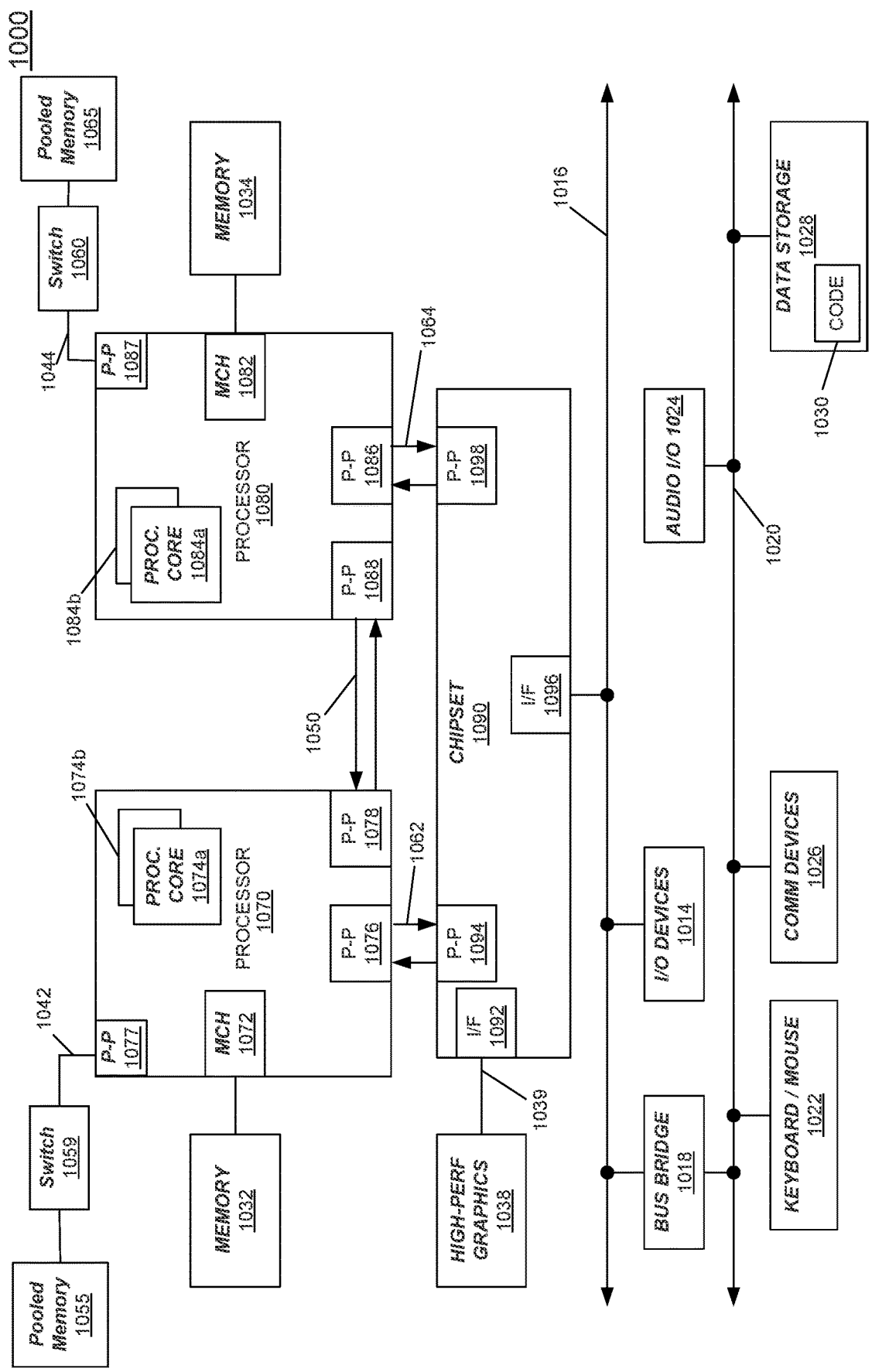
FIG. 10 is a block diagram of a system in accordance with another embodiment of the present invention.

Referring now to FIG. 10, shown is a block diagram of a system in accordance with another embodiment such as an edge platform. As shown in FIG. 10, multiprocessor system 1000 includes a first processor 1070 and a second processor 1080 coupled via a point-to-point interconnect 1050. As shown in FIG. 10, each of processors 1070 and 1080 may be many core processors including representative first and second processor cores (i.e., processor cores 1074*a* and 1074*b* and processor cores 1084*a* and 1084*b*).

In the embodiment of FIG. 10, processors 1070 and 1080 further include point-to point interconnects 1077 and 1087, which couple via interconnects 1042 and 1044 (which may be CXL buses) to switches 1059 and 1060. Such traffic may be according to multiple protocols, including CXL.cache and CXL.memory protocol traffic via a selected one of multiple logical ports as described herein. In turn, switches 1059, 1060 couple to pooled memories 1055 and 1065.

Still referring to FIG. 10, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 10, MCH's 1072 and 1082 couple the processors to respective memories, namely a memory 1032 and a memory 1034, which may be portions of system memory (e.g., DRAM) locally attached to the respective processors. First processor 1070 and second processor 1080 may be coupled to a chipset 1090 via P-P interconnects 1076 and 1086, respectively. As shown in FIG. 10, chipset 1090 includes P-P interfaces 1094 and 1098.

Furthermore, chipset 1090 includes an interface 1092 to couple chipset 1090 with a high performance graphics engine 1038, by a P-P interconnect 1039. As shown in FIG. 10, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 824 may be coupled to second bus 1020.

Figure 11:
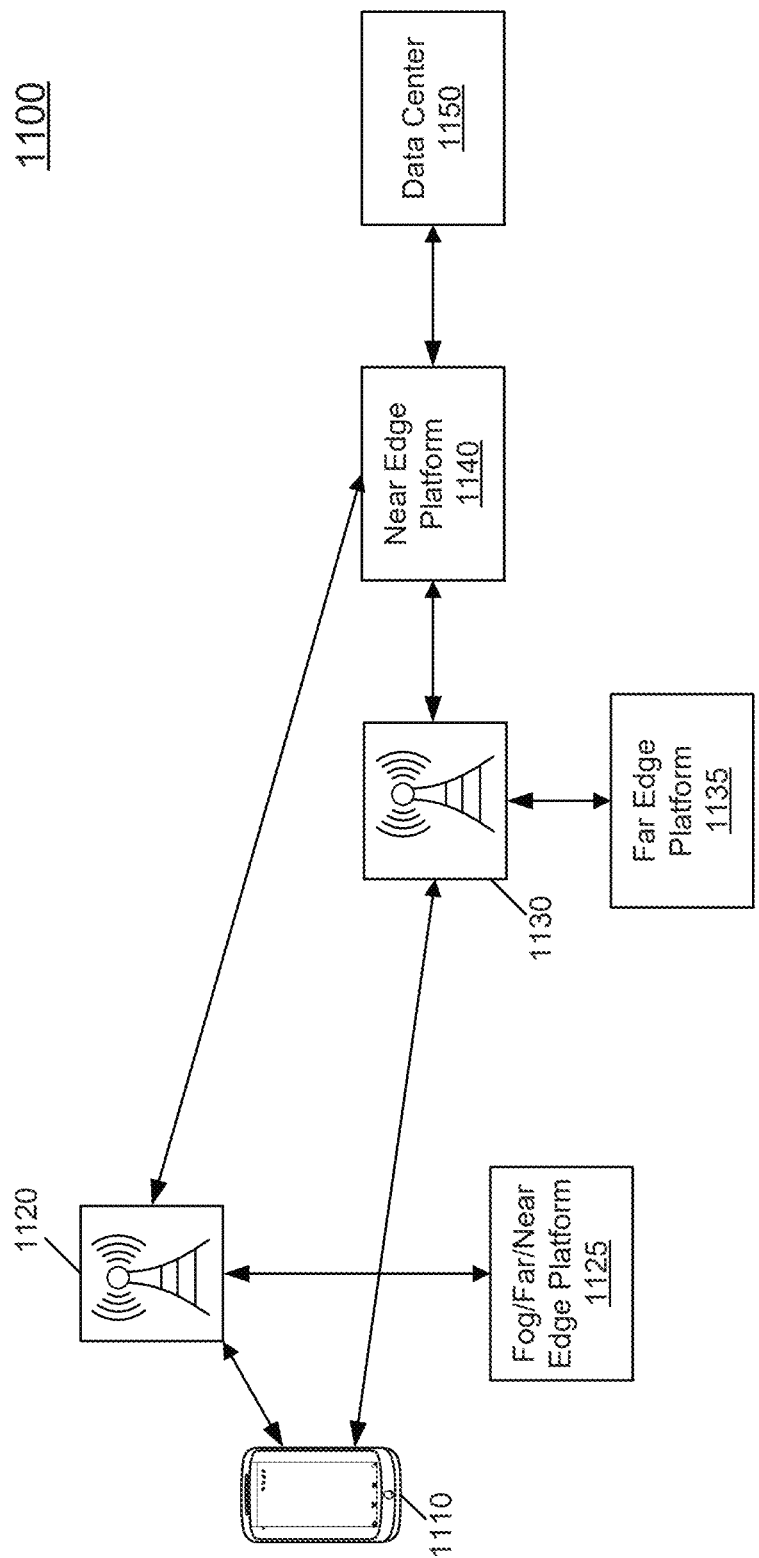
FIG. 11 is a block diagram of a network architecture in accordance with an embodiment.

Embodiments as described herein can be used in a wide variety of network architectures. To this end, many different types of computing platforms in a networked architecture that couples between a given edge device and a datacenter can perform the fine-grained monitoring and tracing described herein. Referring now to FIG. 11, shown is a block diagram of a network architecture in accordance with another embodiment of the present invention. As shown in FIG. 11, network architecture 1100 includes various computing platforms that may be located in a very wide area, and which have different latencies in communicating with different devices.

In the high level view of FIG. 11, network architecture 1100 includes a representative device 1110, such as a smartphone. This device may communicate via different radio access networks (RANs), including a RAN 1120 and a RAN 1130. RAN 1120 in turn may couple to a platform 1125, which may be an edge platform such as a fog/far/near edge platform, and which may leverage embodiments herein. Other requests may be handled by a far edge platform 1135 coupled to RAN 1130, which also may leverage embodiments.

As further illustrated in FIG. 11, another near edge platform 1140 may couple to RANs 1120, 1130. Note that this near edge platform may be located closer to a data center 1150, which may have a large amount of computing resources. By pushing messages to these more remote platforms, greater latency is incurred in handling requests on behalf of edge device 1110. Understand that all platforms shown in FIG. 11 may incorporate embodiments as described herein to communication, e.g., CXL.cache and CXL.memory protocol traffic via a selected one of multiple logical ports as described herein.

The following examples pertain to further embodiments.

In one example, an apparatus includes: a transaction layer circuit to output transaction layer information; and a link layer circuit coupled to the transaction layer circuit, the link layer circuit to receive and process the transaction layer information and to output link layer information to a physical circuit. The link layer circuit may include a first selection circuit to receive and direct cache memory protocol traffic to a selected one of a first logical port and a second logical port.

In an example, the apparatus further comprises a control circuit coupled to the first selection circuit, the control circuit to control the first selection circuit to direct the cache memory protocol traffic to the second logical port, the second logical port mapped to a second physical port of the physical circuit.

In an example, the control circuit comprises: a first buffer to store the cache memory protocol traffic; and a second buffer to store memory protocol traffic.

In an example, the first selection circuit is coupled to the first buffer, the first selection circuit to direct the cache memory protocol traffic to a selected one of the first logical port or the second logical port according to control information from the control circuit.

In an example, the apparatus further comprises an address decoder coupled to the second buffer, the address decoder to direct the memory protocol traffic to at least one of the first logical port, the second logical port, a third logical port, and a fourth logical port.

In an example, the apparatus further comprises: a second selection circuit coupled to the first logical port and a third logical port and to direct the cache memory protocol traffic and memory protocol traffic to another selection circuit; and a third selection circuit coupled to the second logical port and a fourth logical port and to direct the cache memory protocol traffic and the memory protocol traffic to the another selection circuit.

In an example, the apparatus further comprises the another selection circuit coupled to the second selection circuit and the third selection circuit.

In an example, the apparatus further comprises at least one configuration register having a first field to store a first indicator, which when a first value is to cause the first selection circuit to direct the cache memory protocol traffic to the second logical port and a second field to store a second indicator which, when set, is to prevent an update to the first indicator.

In an example, the control circuit is to receive a configuration message based on a protocol encoding received from the physical circuit, the protocol encoding based on detection of a type of device coupled to the second physical port of the physical circuit.

In an example, the control circuit is to cause the first selection circuit to direct the cache memory protocol traffic to the second logical port when a CXL Type 2 device is coupled to the second physical port of the physical circuit.

In another example, a method includes: receiving configuration information regarding connection of a cache-capable device to a first port of a plurality of ports of a physical circuit coupled to the cache-capable device via a data bus; in response to the configuration information, configuring a first selection circuit of a link layer coupled to the physical circuit to cause cache memory protocol traffic to be directed to a first logical port of the link layer mapped to the first port of the physical circuit; and directing the cache memory protocol traffic, via the first selection circuit, to the first logical port and thereafter to the first port of the physical circuit for transfer to the cache-capable device.

In an example, the method further comprises receiving the configuration information comprising one or more protocol encoding messages from the physical circuit, to indicate detection of one or more devices coupled to the plurality of ports of the physical circuit.

In an example, the method further comprises receiving the configuration information comprising a first indicator to indicate that the cache-capable device is coupled to the first port of the physical circuit.

In an example, the method further comprises directing memory protocol traffic, via an address decoder, to a second logical port of the link layer and thereafter to a second port of the plurality of ports of the physical circuit for transfer to a memory device coupled to the second port. In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes: a host processor comprising one or more cores and a CXL interface circuit; a cache-capable device coupled to the host processor via a CXL link, the cache-capable device coupled to a second physical port, the second physical port mapped to a second logical port; and a memory device coupled to the host processor via the CXL link, the memory device coupled to a first physical port, the first physical port mapped to a first logical port.

In an example, the CXL interface circuit may include: a transaction layer circuit to output transaction layer information; a link layer circuit coupled to the transaction layer circuit, the link layer circuit to receive and process the transaction layer information and to output link layer information to a physical circuit. The link layer circuit may include: a first selection circuit to receive and direct CXL-.cache protocol traffic to a selected one of a first logical port and a second logical port; and a plurality of logical ports comprising the first logical port, the second logical port, a third logical port and a fourth logical port, where the first selection circuit is coupled to the first logical port and the second logical port. The CXL interface circuit further may include a physical layer circuit coupled to the link layer circuit, the physical layer circuit comprising a logical circuit and a physical circuit, the physical circuit comprising a plurality of physical ports comprising a first physical port, a second physical port, a third physical port and a fourth physical port.

In an example, the link layer circuit comprises a control circuit coupled to the first selection circuit, the control circuit to control the first selection circuit to direct the CXL.cache protocol traffic to the second logical port.

In an example, the control circuit comprises: a first buffer to store the CXL.cache protocol traffic; and a second buffer to store CXL.memory protocol traffic.

In an example, the first selection circuit is coupled to the first buffer, the first selection circuit to direct the CXL.cache protocol traffic to the second logical port according to control information from the control circuit.

In an example, the control circuit is to generate the control information in response to a protocol encoding from the physical layer circuit, the protocol encoding to indicate detection of the cache-capable device coupled to the second physical port.

In an example, the control circuit is to further disable cache functionality of the cache-capable device when another cache-capable device is coupled to the first physical port, the first physical port advertised as Port 0.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a transaction layer circuit to output transaction layer information; and
   a link layer circuit coupled to the transaction layer circuit, the link layer circuit to receive and process the transaction layer information and to output link layer information to a physical circuit, the link layer circuit comprising:
   a first logical port and a second logical port to be mapped to physical ports of the physical circuit;
   a first selection circuit to receive and direct cache memory protocol traffic to a selected one of the first logical port and the second logical port; and
   a control circuit coupled to the first selection circuit, the control circuit, based at least in part on an identification of a type of device received via a protocol encoding from the physical circuit, is to:
   apply a predefined configuration for port mapping selected based on the identified type of device;
   map the second logical port to the second physical port of the physical circuit using the predefined configuration; and
   configure the first selection circuit to direct the cache memory protocol traffic to the second logical port based on the identified type of device.

2. The apparatus of claim 1, wherein the control circuit comprises:
   a first buffer to store the cache memory protocol traffic; and
   a second buffer to store memory protocol traffic.

3. The apparatus of claim 2, wherein the first selection circuit is coupled to the first buffer, the first selection circuit to direct the cache memory protocol traffic to a selected one of the first logical port or the second logical port according to control information from the control circuit.

4. The apparatus of claim 2, further comprising an address decoder coupled to the second buffer, the address decoder to direct the memory protocol traffic to at least one of the first logical port, the second logical port, a third logical port, and a fourth logical port.

5. The apparatus of claim 1, further comprising:
   a second selection circuit coupled to the first logical port and a third logical port and to direct the cache memory protocol traffic and memory protocol traffic to another selection circuit; and
   a third selection circuit coupled to the second logical port and a fourth logical port and to direct the cache memory protocol traffic and the memory protocol traffic to the another selection circuit.

6. The apparatus of claim 5, further comprising the another selection circuit coupled to the second selection circuit and the third selection circuit.

7. The apparatus of claim 1, further comprising at least one configuration register having a first field to store a first indicator, which when a first value is to cause the first selection circuit to direct the cache memory protocol traffic to the second logical port and a second field to store a second indicator which, when set, is to prevent an update to the first indicator.

8. The apparatus of claim 1, wherein the control circuit is to receive a configuration message based on a protocol encoding received from the physical circuit, the protocol encoding based on detection of the type of device coupled to the second physical port of the physical circuit.

9. The apparatus of claim 1, wherein the control circuit is to cause the first selection circuit to direct the cache memory protocol traffic to the second logical port when a Compute Express Link (CXL) Type 2 device is coupled to the second physical port of the physical circuit.

10. At least one non-transitory computer readable storage medium comprising instructions that when executed enable a system to:
    receive configuration information comprising a protocol encoding received from the physical circuit, the protocol encoding indicating a type of device regarding connection of a cache-capable device to a first port of a plurality of ports of a physical circuit coupled to the cache-capable device via a data bus, the physical circuit configurable to enable flexible attach points of device types to the plurality of physical ports;

in response to the configuration information, select and apply a predefined configuration, which is a predetermined setup for mapping logical ports to physical ports based on the type of device, to configure a first selection circuit of a link layer coupled to the physical circuit to cause cache memory protocol traffic to be directed to a first logical port of a plurality of logical ports of the link layer and map the first logical port to the first port of the physical circuit, wherein the plurality of logical ports are configurable to be flexibly mapped to the plurality of physical ports; and direct the cache memory protocol traffic, via the first selection circuit, to the first logical port and thereafter to the first port of the physical circuit for transfer to the cache-capable device.

11. The at least one non-transitory computer readable storage medium of claim 10, further comprising instructions that when executed enable the system to receive the configuration information comprising one or more protocol encoding messages from the physical circuit, to indicate detection of one or more devices coupled to the plurality of ports of the physical circuit.

12. The at least one non-transitory computer readable storage medium of claim 10, further comprising instructions that when executed enable the system to receive the configuration information comprising a first indicator to indicate that the cache-capable device is coupled to the first port of the physical circuit.

13. The at least one non-transitory computer readable storage medium of claim 10, further comprising instructions that when executed enable the system to direct memory protocol traffic, via an address decoder, to a second logical port of the link layer and thereafter to a second port of the plurality of ports of the physical circuit for transfer to a memory device coupled to the second port.

14. A system comprising:
a host processor comprising one or more cores and a Compute Express Link (CXL) interface circuit, the CXL interface circuit comprising:
a transaction layer circuit to output transaction layer information;
a link layer circuit coupled to the transaction layer circuit, the link layer circuit to receive and process the transaction layer information and to output link layer information to a physical circuit, the link layer circuit comprising:
a first selection circuit to receive and direct CXL.cache protocol traffic to a selected one of a first logical port and a second logical port; and
a plurality of logical ports comprising the first logical port, the second logical port, a third logical port and a fourth logical port, wherein the first selection circuit is coupled to the first logical port and the second logical port; and a physical layer circuit coupled to the link layer circuit, the physical layer circuit comprising a logical circuit and a physical circuit, the physical circuit comprising a plurality of physical ports comprising a first physical port, a second physical port, a third physical port and a fourth physical port, wherein the physical circuit is configurable to enable flexible attach points of device types to the plurality of physical ports, and the plurality of logical ports are configurable to be flexibly mapped to the plurality of physical ports;

a cache-capable device coupled to the host processor via a CXL link, the cache-capable device coupled to the second physical port, the second physical port mapped to the second logical port using a predefined configuration selected based on a protocol encoding received from the physical circuit, the protocol encoding identifying a type of device; and a memory device coupled to the host processor via the CXL link, the memory device coupled to the first physical port, the first physical port mapped to the first logical port using the predefined configuration.

15. The system of claim 14, wherein the link layer circuit comprises a control circuit coupled to the first selection circuit, the control circuit to control the first selection circuit to direct the CXL.cache protocol traffic to the second logical port.

16. The system of claim 15, wherein the control circuit comprises:
a first buffer to store the CXL.cache protocol traffic; and
a second buffer to store CXL.memory protocol traffic.

17. The system of claim 16, wherein the first selection circuit is coupled to the first buffer, the first selection circuit to direct the CXL.cache protocol traffic to the second logical port according to control information from the control circuit.

18. The system of claim 17, wherein the control circuit is to generate the control information in response to a protocol encoding from the physical layer circuit, the protocol encoding to indicate detection of the cache-capable device coupled to the second physical port.

19. The system of claim 17, wherein the control circuit is to further disable cache functionality of the cache-capable device when another cache-capable device is coupled to the first physical port, the first physical port advertised as Port 0.

* * * * *